(12) United States Patent
Grutta et al.

(10) Patent No.: US 11,725,121 B2
(45) Date of Patent: Aug. 15, 2023

(54) PRINTED ELASTOMERIC ELEMENTS

(71) Applicant: Purple Innovation, LLC, Lehi, UT (US)

(72) Inventors: James T. Grutta, Draper, UT (US); Brett Pearson, Taylorsville, UT (US); Robert W. Taylor, Highland, UT (US); David Ewell, South Jordan, UT (US); Bob Watters, Riverton, UT (US); Brock Keith Harris, Draper, UT (US); Dhyey Yogesh Acharya, Lehi, UT (US); Russell B. Whatcott, Eagle Mountain, UT (US)

(73) Assignee: Purple Innovation, LLC, Lehi, UT (US)

( * ) Notice: Subject to any disclaimer, the term of this patent is extended or adjusted under 35 U.S.C. 154(b) by 55 days.

(21) Appl. No.: 17/170,558

(22) Filed: Feb. 8, 2021

(65) Prior Publication Data

US 2021/0246336 A1 Aug. 12, 2021

Related U.S. Application Data

(60) Provisional application No. 62/971,016, filed on Feb. 6, 2020.

(51) Int. Cl.
*A47G 9/02* (2006.01)
*C09J 7/21* (2018.01)
(Continued)

(52) U.S. Cl.
CPC .............. *C09J 7/21* (2018.01); *A47G 9/0223* (2013.01); *B32B 3/14* (2013.01); *B32B 5/02* (2013.01);
(Continued)

(58) Field of Classification Search
None
See application file for complete search history.

(56) References Cited

U.S. PATENT DOCUMENTS 4,839,934 A * 6/1989 Rojas ................... A47G 9/0207
5/486
7,870,623 B2 1/2011 Judd
(Continued)

OTHER PUBLICATIONS

USPTO acting as International Searching Authority, "International Search Report and Written Opinion," International Application No. PCT/US2021/017112, dated Apr. 30, 2021.

*Primary Examiner* — Frank J Vineis
*Assistant Examiner* — Nicole T Gugliotta
(74) *Attorney, Agent, or Firm* — Dentons Durham Jones Pinegar

(57) ABSTRACT

An article of manufacture, such as a weighted blanket, a cushioning element, or the like, includes an elastomeric element that includes elongated elements that follow non-linear, partially overlapping paths and voids between adjacent portions of the elongated elements. Such an elastomeric element may define a weighted layer of a weighted blanket, a cushioning layer of a cushioning element of the like. The elastomeric element may be secured directly to a substrate, such as a fabric layer. Alternatively, an adhesion layer may secure the elastomeric element to the substrate. An adhesion layer may cover only a portion of the substrate. A cover may be provided over the elastomeric element. Together, the cover and the substrate may contain the elastomeric element.

17 Claims, 8 Drawing Sheets

(51) Int. Cl.
*B32B 3/14* (2006.01)
*B32B 5/02* (2006.01)
*B32B 7/14* (2006.01)
*B32B 37/12* (2006.01)
*C09J 7/38* (2018.01)
*B05C 11/10* (2006.01)
*B29C 48/00* (2019.01)
*B29C 48/154* (2019.01)
*B05C 5/02* (2006.01)
*B29C 48/16* (2019.01)
*B29C 48/345* (2019.01)
*B29C 48/92* (2019.01)
*B32B 5/06* (2006.01)
*B32B 27/06* (2006.01)
*B32B 27/08* (2006.01)
*B32B 27/12* (2006.01)
*B32B 5/26* (2006.01)

(52) U.S. Cl.
CPC ............... *B32B 7/14* (2013.01); *B32B 37/12* (2013.01); *C09J 7/38* (2018.01); *B32B 2307/718* (2013.01)

(56) References Cited

U.S. PATENT DOCUMENTS

| | | | |
|---|---|---|---|
| 8,424,137 | B1 | 4/2013 | Pearce et al. |
| 9,956,129 | B2 | 5/2018 | Kjell |
| 2004/0072942 | A1* | 4/2004 | Chen ................ C09J 153/02 524/549 |
| 2016/0037944 | A1 | 2/2016 | Savignano |
| 2020/0179641 | A1* | 6/2020 | Russin, Sr. ........... A61M 21/02 |
| 2020/0236907 | A1* | 7/2020 | Nilsson ................ A47G 9/0223 |
| 2021/0093104 | A1* | 4/2021 | Clark ................ A61F 7/0097 |

* cited by examiner

PRINTED ELASTOMERIC ELEMENTS

CROSS-REFERENCE TO RELATED APPLICATION

A claim for priority to the Feb. 6, 2020 filing date of U.S. Provisional Patent Application No. 62/971,016 titled BLANKET WITH ELASTOMERIC WEIGHTING ELEMENTS ("the '016 Provisional Application") is hereby made pursuant to 35 U.S.C. § 119(e). The entire disclosure of the '016 Provisional Application is hereby incorporated herein.

TECHNICAL FIELD

This disclosure relates generally to articles of manufacture with elastomeric elements and, more specifically, to articles of manufacture with elastomeric materials that have been printed onto a substrate. Even more specifically, this disclosure relates to articles of manufacture that include an elastomeric polymer that has been applied to (e.g., extruded onto, dripped onto, drizzled onto, printed onto, etc.) a fabric layer in such a way that the elastomeric polymer extends substantially across the fabric layer while covering only a portion of the fabric layer. In some embodiments, the elastomeric polymer may be applied in overlapping configurations (e.g., continuous, partially superimposed loops, etc.). This disclosure also relates to methods for manufacturing elastomeric cushion elements and to apparatuses that may be used to apply elastomeric polymers to substrates.

DISCLOSURE

Generally, articles of manufacture of this disclosure with elastomeric elements that have been printed onto a substrate are disclosed. The printed elastomeric element of such an article of manufacture may be applied to the substrate in such a way that the elastomeric polymer extends substantially across the substrate while covering only a portion of the substrate. The substrate may comprise a pliable substrate, such as a fabric. Application of the elastomeric polymer to the substrate may be conducted in a controlled fashion and, thus, may be referred to herein as a "printing" process. Some examples of suitable printing processes for forming an elastomeric element of this disclosure include extrusion, drizzling, dripping, computer printing, and the like. In some embodiments, the elastomeric polymer may be applied in overlapping configurations (e.g., continuous, partially superimposed loops, etc.). A few examples of articles of manufacture that may be formed by printing an elastomeric element onto a substrate include weighted blankets, mats, and cushioning elements.

In a more specific aspect, this disclosure relates to a weighted blanket. A weighted blanket according to this disclosure includes a substrate comprising a fabric layer to which an elastomeric element that comprises a weighted member is adhered; the weighted member may be laminated onto the fabric layer. The fabric layer, which may be referred to as a "first fabric layer," may comprise a first surface of the weighted blanket.

The fabric layer of the weighted blanket may include any suitable fabric. The fabric may impart the weighted blanket with one or more desired characteristics. Without limitation, the fabric may impart the fabric layer with a particular texture (e.g., softness to the touch, etc.), cooling properties (e.g., moisture wicking, ventilation or breathability, etc.), or the like. In some embodiments, the fabric layer may comprise a fabric that substantially lacks stretchability; a fabric that substantially lacks stretchability may stretch due to a weave of the fabric, but lack stretchable fibers. In other embodiments, the fabric of the fabric layer may be stretchable. Without limitation, a stretchable fabric may comprise a two-way stretch fabric or a four-way stretch fabric. In some embodiments, a material and/or a configuration of the weighted member of the weighted blanket may enable a stretchable fabric of the fabric layer to be stretched to its full extent; the weighted member may not hinder stretching of the fabric layer. Further, the stretchable fabric may be stretched to its full extent without causing the weighted member to delaminate from the fabric layer.

The weighted member may impart the weighted blanket with a desired weight and/or density. The weighted member may also be breathable. The weighted member of the weighted blanket may comprise an elastomeric element defined from an elastomeric polymer. Any of a variety of suitable materials may be used as the elastomeric polymer of the weighted member. Without limitation, the elastomeric polymer may comprise an extended triblock copolymer. Repeating units of the triblock copolymer may have an A-B-A configuration; for example, a styrene-butadiene-styrene (SBS) thermoplastic elastomer, a styrene-ethylene-butylene-styrene (SEBS) thermoplastic elastomer, or the like. The triblock copolymer may be extended with an oil (e.g., mineral oil, etc.), a resin, or any other suitable material. In some embodiments, the elastomeric polymer may have a void-inducing configuration (e.g., it may be foamed, it may include microspheres (e.g., acrylic microspheres, glass microspheres, etc.), etc.), which may reduce a density of the elastomeric polymer. In other embodiments, the elastomeric polymer may include additives that increase its density (e.g., it may include solid ceramic microspheres, solid glass microspheres, etc.). In some embodiments, the elastomeric polymer may include other ingredients that impart it with desired characteristics. Relative proportions of the ingredients of such an elastomeric polymer may also impart it with desired properties (e.g., hardness, elasticity, density, texture, tactile properties, etc.). A specific embodiment of an elastomeric polymer that may be used to define the weighted member of a weighted blanket according to this disclosure is disclosed by U.S. Pat. No. 8,424,137 ("the '137 Patent"), the entire disclosure of which is hereby incorporated herein.

In manufacturing a weighted blanket or any other article of manufacture according to this disclosure, the elastomeric element may be applied to the substrate in such a way the elastomeric element extends substantially across the substrate, but covers only a portion of the substrate. In an example of an elastomeric element that extends substantially across the substrate while covering only a portion of the substrate, the elastomeric element may comprise at least one elongated element that follows a nonlinear, partially overlapping path; for example, the at least one elongated element may follow a winding path (e.g., an elongated, interconnected series of loops; a meandering path, a path resembling a wave, etc.) over at least a portion of the substrate. A series of such elongated elements may be positioned across the substrate to define solid structures over the substrate; for example, the series of elongated elements of elastomeric polymer may be oriented substantially parallel to one another. Such series of elongated elements may define rows, columns, diagonals, concentric shapes, or the like.

As another example of an elastomeric element that extends substantially across the substrate while only partially covering the substrate, the elastomeric element may comprise a plurality of discrete elements (e.g., spots, drops, printed elements, etc.) arranged substantially across the substrate. The discrete elements of the elastomeric element may be arranged in a manner that appears to be random (i.e., a pseudo-random arrangement), in a pattern, as a design, or in any other desired manner.

In various embodiments, the elastomeric polymer may cover, at most, half of an area over which it extends. In more specific embodiments, the elastomeric polymer may cover, at most, one half of the area over which it extends. Alternatively, the elastomeric polymer may cover, at most, one fourth of the area over which it extends. As another alternative, the elastomeric polymer may cover, at most, one tenth of the area over which it extends.

In some embodiments, the elastomeric element of an article of manufacture according to this disclosure may comprise an adhesion layer and a functional layer. The adhesion layer may adhere to the substrate, while the functional layer may adhere to the adhesion layer. In embodiments where the article of manufacture comprises a weighted blanket, the functional layer may comprise a weighted layer. In embodiments where the article of manufacture comprises a cushioning element, the functional layer may comprise a cushioning layer. One or both of the adhesion layer and the functional layer may comprise an elastomeric polymer, and may have any suitable configuration, including, but not limited to, those disclosed previously herein.

The adhesion layer and the functional layer may extend substantially across the substrate. In some embodiments, the adhesion layer may also cover only a portion of the area of the substrate over which it extends (e.g., a portion of a surface of the substrate, substantially all of the surface of the substrate, an entire surface of the substrate, etc.). For example, the adhesion layer may cover, at most, one fourth of the area over which it extends. As another example, the adhesion layer may cover, at most, one tenth of the area over which it extends. In other embodiments, the adhesion layer may substantially cover the area of the substrate over which it extends; i.e., the adhesion layer may comprise a confluent layer.

The functional layer may likewise cover only a portion of the area of the substrate over which it extends. In embodiments where the adhesion layer and the functional layer both have configurations that cover only a portion of the area of the substrate over which they extend, the functional layer may cover only a portion of the adhesion layer. Alternatively, a functional layer with a configuration that covers only a portion of the area of the substrate over which it extends may be completely superimposed over an adhesion layer that covers only a portion of the area of the substrate over which the adhesion layer extends; i.e., the functional layer and the adhesion layer may be completely superimposed. Alternatively, the functional layer substantially cover the area of the substrate over which the functional layer extends In embodiments where both the adhesion layer and the functional layer of an elastomeric element of an article of manufacture according to this disclosure comprise an elastomeric polymer, the same elastomeric polymer may be used for both the adhesive layer and the functional layer. Alternatively, different elastomeric polymers may be used to define the adhesion layer and the functional layer.

Optionally, an article of manufacture according to this disclosure may include a cover on an opposite side of the elastomeric element from the substrate. In embodiments where the article of manufacture comprises a weighted blanket, the weighted blanket may include another fabric layer on an opposite side of the weighted member from the fabric layer—a "first fabric layer"—that defines the substrate of the weighted blanket. This additional fabric layer may comprise a second surface of the weighted blanket; thus, the additional fabric layer may be referred to as a "second fabric layer" of the weighted blanket. The second fabric layer may be secured to the other members of the weighted blanket, including the first fabric layer, in any suitable manner. As an example, edges of the first and second fabric layers may be secured to one another (e.g., sewn together, heat welded in embodiments where the fabric layers comprise thermoplastic synthetic fibers, etc.); intermediate portions of the first and second fabric layers may also be secured (e.g., sewn, heat welded, etc.) to each other. In some embodiments, adhesion between the functional layer and the cover may secure the cover in place over the elastomeric element of the article of manufacture, providing an article of manufacture with an elastomeric element between a substrate and a cover.

An article of manufacture may also include a further layer superimposed with the cover or the substrate. In embodiments where the article of manufacture comprises a weighted blanket, the further layer may comprise a filler, such as a thermally insulating layer (e.g., batting, or wadding; discrete insulating elements (e.g., foam, feathers, down, etc.); etc.) disposed against the first fabric layer or the second fabric layer, as well as a third fabric layer covering the thermally insulating layer. In such embodiments, the third fabric layer, the filler layer, and the fabric layer over which the third fabric layer has been superimposed may be quilted to secure these layers to one another.

In another aspect, a method of manufacture includes printing at least a portion of an elastomeric element onto a substrate. As defined herein, "printing" refers to a process for defining one or more portions (e.g., layers, etc.) of the elastomeric element. More specifically, "printing" refers to the controlled application (e.g., deposition, etc.) of one or more materials onto the substrate. In embodiments where the elastomeric layer includes an adhesion layer and a functional layer, the adhesion layer may be printed onto a substrate, the functional layer may be printed onto the adhesive layer, or both the adhesion layer and the functional layer may be printed.

The manufacture of a weighted blanket that includes a substrate that comprises a fabric layer and an elastomeric element that comprises a weighted member may include printing at least a portion of the weighted layer onto the fabric layer. Printing of the elastomeric element may comprising printing with an elastomeric polymer. In embodiments where the weighted member includes both an adhesion layer and a weighted layer, one or both the adhesion layer and the weighted layer may be printed. Printing of the adhesion layer may comprise printing an elastomeric polymer onto the fabric layer. Printing of the weighted layer may comprise printing an elastomeric polymer onto the adhesive layer. In embodiments where the adhesion layer and the weighted layer are both printed from an elastomeric polymer, different elastomeric polymers (e.g., an adhesion elastomeric polymer that adheres well to the fabric layer and a weighting elastomeric polymer that adheres well to the adhesion layer and has a sufficient density to impart the weighted layer with a desired weight and density, etc.) may be used or the same elastomeric polymer (e.g., an elastomeric polymer that adheres well to the fabric layer and has a sufficient density to impart the weighted layer with a desired weight and density, etc.) may be used.

In a specific embodiment of a manufacturing process that employs an elastomeric polymer to print at least a portion of an elastomeric element weighted member of a weighted blanket, the elastomeric polymer may be heated to a temperature sufficient to cause the elastomeric polymer to adhere to the substrate (i.e., a first temperature) (e.g., about 450° F. to about 480° F. where the elastomeric polymer comprises oil extended SBS or SEBS and the substrate comprises a fabric layer, etc.). In embodiments where an elastomeric element that includes multiple layers (e.g., an adhesion layer and one or more functional layers, etc.) is applied to the substrate, an adhesion layer may be defined in the manner identified above, while each subsequent layer, or each functional layer, may be applied at a temperature (i.e., a second temperature) sufficient to enable the layer being printed to adhere to the immediately underlying layer. Such a second temperature may be the same as or lower than the first temperature (e.g., the second temperature may be about 380° F., etc., where the functional layer comprises an elastomeric polymer comprising oil extended SBS or SEBS, etc.).

Embodiments of manufacturing systems are also disclosed. In a specific embodiment, a manufacturing system according to this disclosure may comprise an extrusion head fitted with a tube that includes a series of material ejection ports. As an elastomeric polymer is heated to its melting point or a higher temperature and extruded, the liquefied elastomeric polymer may flow from the material ejection ports and onto a substrate. The liquefied elastomeric polymer may be extruded from the extrusion head as one or both of the substrate and the extrusion head moves relative to the other. The liquefied elastomeric polymer may be extruded at a rate, or under a force, that enables the elastomeric polymer to define an elongated element on the substrate. In some embodiments, the rate at which the liquefied elastomeric polymer is extruded may impart the elongated element with a winding configuration; for example, a configuration that resembles a wave, a meandering configuration, an elongated series of loops, or the like.

In another specific embodiment, the manufacturing system may include a printer that can apply an elastomeric polymer to a substrate in a more controlled manner. The printer may include a print head that moves from side to side (e.g., along an x-axis, etc.) as the substrate moves lengthwise (e.g., along a y-axis, etc.) beneath the print head.

Other aspects of the disclosed subject matter, as well as features and advantages of various aspects of the disclosed subject matter, should become apparent to those of ordinary skill in the art through the preceding disclosure, the images that follow, and the appended claims.

DETAILED DESCRIPTION

Figure 1:
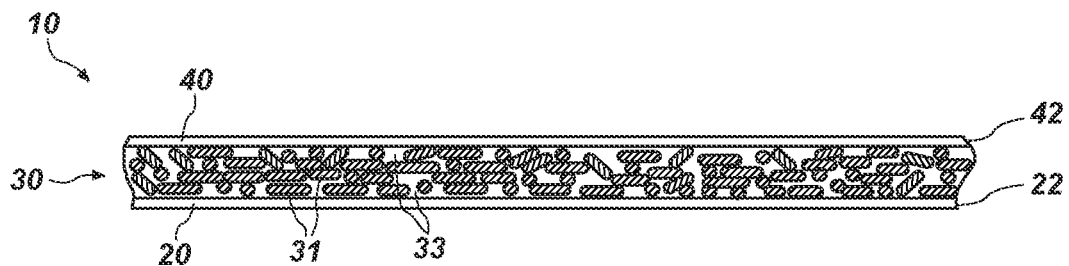
FIG. 1 provides a cross-sectional representation of an embodiment of an article of manufacture according to this disclosure, including a substrate, an elastomeric element, and an optional cover.

With reference to FIG. 1, an embodiment of an article of manufacture 10 according to this disclosure is depicted. The article of manufacture 10 includes a substrate 20, and an elastomeric element 30 carried by and secured to the substrate 20. The article of manufacture 10 may also include a cover 40 over the elastomeric element 30.

In some embodiments, the substrate 20 of the article of manufacture 10 may comprise a pliable element. Without limitation, such a substrate 20 may comprise a fabric. Any fabric suitable for the article of manufacture may be used. For example, in embodiments where the article of manufacture 10 is a weighted blanket, the substrate 20 may comprise a fabric that imparts a surface of the weighted blanket with one or more desired characteristics, such as a particular texture (e.g., softness to the touch, etc.), cooling properties (e.g., moisture wicking, ventilation, etc.), or the like. In some embodiments, the fabric may substantially lack stretchability; a fabric that substantially lacks stretchability may stretch due to a weave of the fabric, but lack stretchable fibers. In other embodiments, the fabric may be stretchable. Without limitation, a stretchable fabric may comprise a two-way stretch fabric or a four-way stretch fabric that may be stretched to its full extent without causing the elastomeric element 30 to delaminate from the substrate 20.

Figure 2:
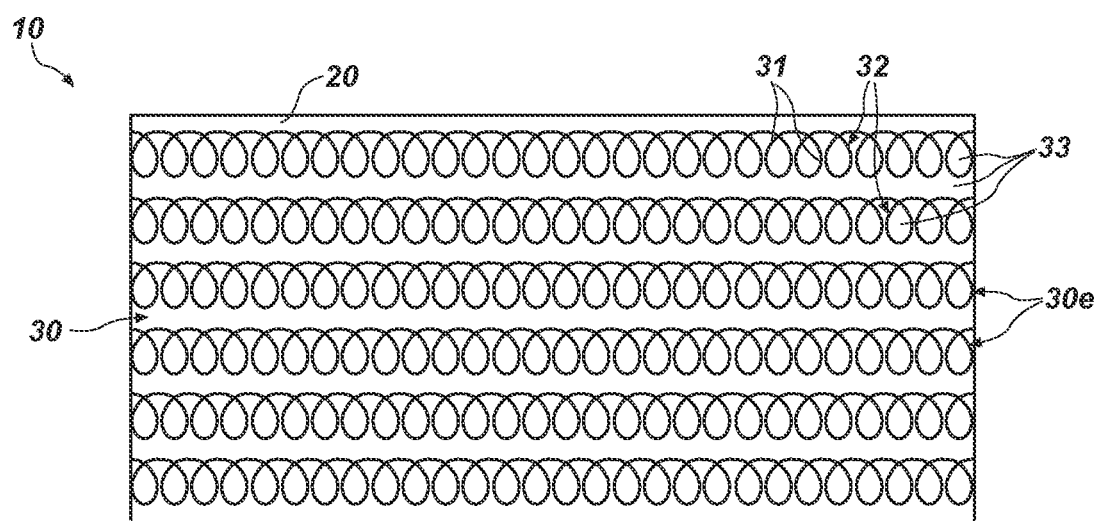
FIG. 2 is a top view showing the substrate and the elastomeric element of the embodiment of the article of manufacture shown in FIG. 1.

With added reference to FIG. 2, the elastomeric element 30 of the article of manufacture 10 may comprise a single element or a plurality of sections 30e. In the embodiment depicted by FIG. 2, the elastomeric element 30 includes a plurality of sections 30e arranged parallel to one another. The elastomeric element 30 or each section 30e thereof may comprise an arrangement of solid structures 31 that define voids 33 throughout the elastomeric element 30. A single elongated solid structure 31 may define an entire section 30*e* of the elastomeric element 30 or the entire elastomeric element 30. The elastomeric element 30 may include a single layer of partially overlapped solid structures 31 or a plurality of layers of overlapping solid structures 31. The solid structures 31 and voids 33 may be randomly arranged. The solid structures 31 and voids 33 may have configurations that enable air to readily flow through the elastomeric element 30 in a variety of directions, which may impart the elastomeric element 30 and the article of manufacture 10 of which the elastomeric element 30 is a part with breathability. The solid structures 31 of the elastomeric element 30 may be secured to the substrate 20. For example, the solid structures 31 may be adhered to the substrate 20. The material that defines the solid structures 31 may adhere to the substrate 20 in any of a variety of ways. For example, a tackiness of the material may adhesively secure the solid structures 31 to a surface of the substrate 20, the material may impregnate voids in the substrate 20 (e.g., engagement voids formed in the substrate 20, voids between fibers that define the substrate 20, voids within fibers that define the substrate 20, etc.), or the material may adhere to the substrate 20 by a combination of adhesion, or tackiness, and impregnation. Alternatively, a separate adhesive (e.g., an adhesive film, an adhesive pattern, etc., applied to the substrate 20) may secure the elastomeric element 30 to the substrate 20.

In various embodiments, the solid structures 31 of the elastomeric element 30 may be printed onto the substrate 20. In more specific embodiments, the solid structures 31 of the elastomeric element 30 may comprise continuous elongated elements that overlap themselves and/or each other to define the voids 33 of the elastomeric element 30. For example, such a solid structure 31 may follow a winding path (e.g., an elongated, interconnected series of partially superimposed loops 32; a meandering path, a path resembling a wave, etc.) over at least a portion of the substrate 20, over another portion of the same solid structure 31, and/or over another solid structure 31.

Any of a variety of suitable materials may be used to define the solid structures 31 of the elastomeric element 30 and, thus, the elastomeric element 30 itself. In some embodiments, the solid structures 31 may be defined from an elastomeric polymer. The elastomeric polymer may adhere well to the substrate 20 and have a sufficient density to impart the elastomeric element 30 with a desired weight and density. The elastomeric polymer may also compress under a load and then resiliently return to a relaxed state once the load is removed. In embodiments where the substrate 20 is stretchable, a stretchability and a resilience of the elastomeric polymer may match or exceed a stretchability and a resilience of the substrate 20, which may enable the substrate 20 to be stretched to its full extent. Thus, the elastomeric element 30 may not hinder stretching of the substrate 20 or delaminate from the substrate 20. Without limitation, the elastomeric polymer may comprise an extended triblock copolymer, such as those disclosed by the '137 Patent.

In embodiments where the article of manufacture 10 includes a cover 40, the cover 40 may comprise any material suitable for the intended use of the article of manufacture 10. In embodiments where the article of manufacture 10 comprises a weighted blanket, the cover 40 may comprise a fabric. The fabric of the cover 40 may have one or more desired characteristics, such as a particular texture (e.g., softness to the touch, etc.), cooling properties (e.g., moisture wicking, ventilation or breathability, etc.), or the like. The fabric may substantially lack stretchability. Alternatively, the fabric of the cover 40 may be stretchable.

In some embodiments, peripheral edges 42 of the cover 40 may be secured to peripheral edges 22 of the substrate 20. The peripheral edges 42 of the cover 40 may be secured directly to the peripheral edges 22 of the substrate 20. Alternatively, the peripheral edges 42 of the cover 40 and the peripheral edges 22 of the substrate 20 may be joined to an intervening element, such as a gusset (e.g., a strip of fabric in embodiments where the substrate 20 and the cover 40 comprise fabrics, etc.), a trim element (e.g., piping, another embellishment, etc.), or the like. As an example, the peripheral edges 42 of the cover 40 may be sewn directly or indirectly to the peripheral edges 22 of the substrate 20. As another example, the peripheral edges 42 of the cover 40 may be adhesively secured directly or indirectly to the peripheral edges 22 of the substrate 20. As yet another example, the peripheral edges 42 of the cover 40 may be heat welded directly or indirectly to the peripheral edges 22 of the substrate 20. In any event, by securing the peripheral edges 42 of the cover 40 to the peripheral edges 22 of the substrate 20, the cover 40 and the substrate 20 may define an interior of the article of manufacture 10, within which the elastomeric element 30 of the article of manufacture 10 is contained.

Figure 3:
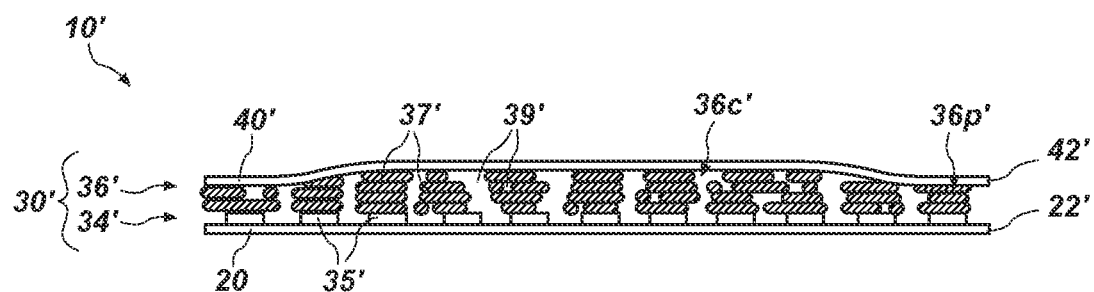
FIG. 3 provides a cross-sectional representation of another embodiment of an article of manufacture according to this disclosure, including a substrate, an elastomeric element, and an optional cover, with the elastomeric element including an adhesion layer and a functional layer.
Figure 12:
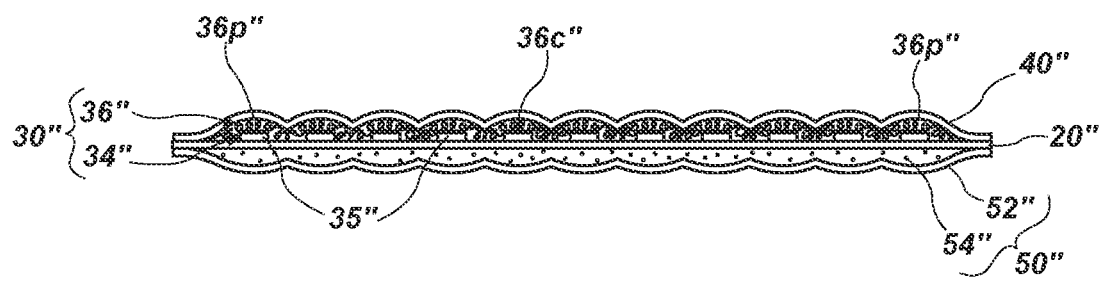
FIG. 12 is a cross-sectional representation of an embodiment of an article of manufacture comprising a weighted blanket.

Turning now to FIG. 3, another embodiment of an article of manufacture 10' is illustrated. Article of manufacture 10' includes a substrate 20', an elastomeric element 30', and, optionally, a cover 40'. The elastomeric element 30' includes two or more layers. More specifically, the elastomeric element 30' may include an adhesion layer 34' and a functional layer 36'. As illustrated by FIG. 3, a thickness of the functional layer 36' may taper downward from a center of an area occupied by the article of manufacture 10' to peripheral edges of the article of manufacture 10'; thus, the functional layer 36' may be thicker at its center 36*c*' than at its periphery 36*p*'. Alternatively, as shown in FIG. 12, embodiments of an article of manufacture 10" may include a functional layer 36" that is thicker at its periphery 36*p*''' than at its center 36*c*'''.

The substrate 20' of the article of manufacture 10' may comprise a pliable element. Such a substrate 20' may comprise a fabric. Any fabric suitable for the article of manufacture 10' may be used. For example, in embodiments where the article of manufacture 10' is a weighted blanket, the substrate 20' may comprise a fabric that imparts a surface of the weighted blanket with one or more desired characteristics, such as a particular texture (e.g., softness to the touch, etc.), cooling properties (e.g., moisture wicking, ventilation or breathability, etc.), or the like. In some embodiments, the fabric may substantially lack stretchability; a fabric that substantially lacks stretchability may stretch due to a weave of the fabric, but lack stretchable fibers. In other embodiments, the fabric may be stretchable. Without limitation, a stretchable fabric may comprise a two-way stretch fabric or a four-way stretch fabric that may be stretched to its full extent without causing the elastomeric element 30' to delaminate from the substrate 20'.

The adhesion layer 34' of the elastomeric element 30' of the article of manufacture 10' may comprise various spaced apart adhesion elements 35'. The adhesion elements 35' may be secured to the substrate 20' of the article of manufacture 10'. For example, the adhesion elements 35' may be adhered to the substrate 20'. The material from which the adhesion elements 35' are defined may adhere to the substrate 20' (e.g., adhesively to a surface of the substrate 20', by impregnating voids in the substrate 20' (e.g., engagement voids formed in the substrate 20', voids between fibers that define the substrate 20', voids within fibers that define the substrate 20', etc.), by a combination of adhesion and impregnation, etc.). Alternatively, a separate adhesive (e.g., an adhesive film, an adhesive pattern, etc., applied to the substrate 20') may secure the adhesion elements 35' of the adhesion layer 34' to the substrate 20'.

Each adhesion element 35' may comprise a continuous elongated element that overlaps itself and/or portions of one or more other adhesion elements 35'. For example, an elongated element of an adhesion element 35' may follow a winding path (e.g., an elongated, interconnected series of partially superimposed loops; a meandering path, a path resembling a wave, etc.) over at least a portion of the substrate 20', over another portion of the same adhesion element 35', and/or over another adhesion element 35'. Alternatively, each adhesion element 35' may comprise a more solid structure, for example, a solid strip, spot, or grid of elastomeric polymer.

The adhesion layer 34' may cover only a portion of the area of the substrate 20' over which the adhesion layer 34' extends (e.g., substantially all of the surface of the substrate 20', with the possible exclusion of peripheral locations of the surface, etc.). By way of example, the adhesion layer 34' may cover, at most, one half of the area of the substrate 20' over which the adhesion layer 34' extends. As another example, the adhesion layer 34' may cover, at most, one fourth of the area of the substrate 20' over which the adhesion layer 34' extends. In still another example, the adhesion layer 34' may cover, at most, one tenth of the area of the substrate 20' over which the adhesion layer 34' extends.

Figure 4A:
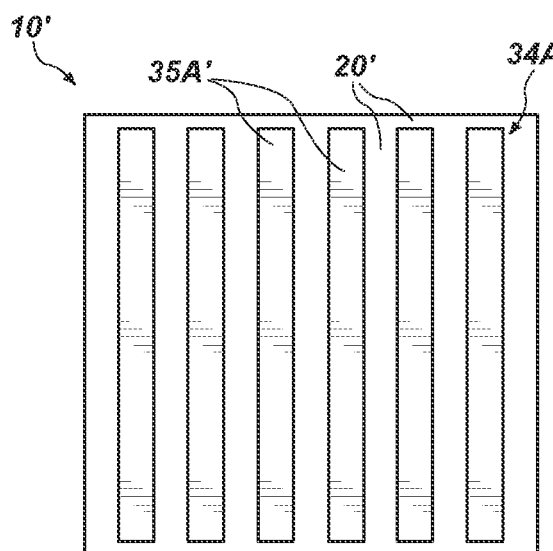
FIG. 4A is a top view showing the substrate and the adhesion layer of the elastomeric element of the article of manufacture shown in FIG. 3.
Figure 4B:
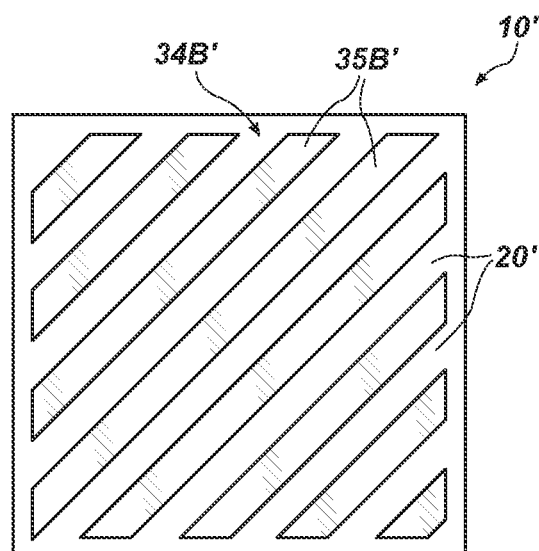
FIG. 4B is a top view showing the substrate and a variation of the adhesion layer of the embodiment of the article of manufacture shown in FIG. 3.
Figure 4C:
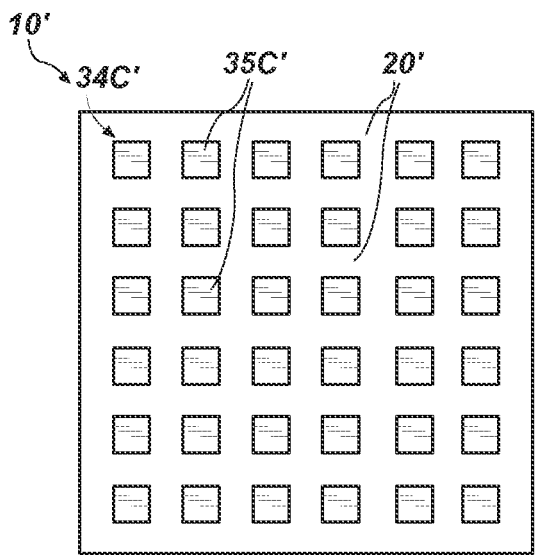
FIG. 4C is a top view showing the substrate and another variation of the adhesion layer of the embodiment of the article of manufacture shown in FIG. 3.
Figure 4D:
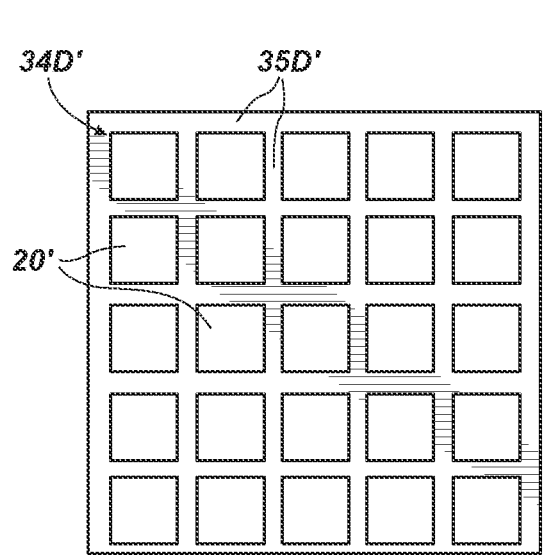
FIG. 4D is a top view showing the substrate and yet another variation of the adhesion layer of the embodiment of the article of manufacture shown in FIG. 3.

FIGS. 4A, 4B, 4C, and 4D show various embodiments of adhesion layers 34A', 34B', 34C', and 34D', respectively, (also referred to individually and collectively as adhesion layer(s) 34') of the elastomeric element 30' of the article of manufacture 10'. In FIG. 4A, adhesion layer 34A' includes elongated adhesion elements 35A' that are oriented along a length or a width of the substrate 20', spaced apart from each other, and arranged parallel to one another in a manner that defines columns or rows on the substrate 20'. In FIG. 4B, the adhesion elements 35B' of adhesion layer 34B' are elongated elements that are oriented diagonally across the substrate 20', spaced apart from one another, and arranged parallel to each other. The adhesion elements 35C' of the adhesion layer 34C' shown in FIG. 4C comprise discrete elements arranged in an array over the substrate 20'. FIG. 4D shows adhesion elements 35D' that intersect each other to define an adhesion layer 34D' that resembles a grid.

In other embodiments, the adhesion layer 34' may substantially cover the area of the substrate 20' over which it extends; i.e., the adhesion layer 34' may comprise a confluent layer.

Any of a variety of suitable materials may be used to define the adhesion layer 34'. In some embodiments, the adhesion layer 34' may be defined from an elastomeric polymer. More specifically, the elastomeric polymer may comprise a material that will adhere well to both the substrate 20' and the functional layer 36'. In embodiments where the substrate 20' is stretchable, a stretchability and a resilience of the elastomeric polymer may match or exceed a stretchability and a resilience of the substrate 20', which may enable the substrate 20' to be stretched to its full extent. Thus, the adhesion layer 34' may not hinder stretching of the substrate 20' or delaminate from the substrate 20'. By way of example, the elastomeric polymer may comprise an extended triblock copolymer, such as those disclosed by the '137 Patent.

The functional layer 36' of the elastomeric element 30' may likewise cover only a portion of the area of the substrate 20' over which the functional layer 36' extends. In embodiments where the adhesion layer 34' and the functional layer 36' both have configurations that cover only a portion of the area of the substrate 20' over which they extend, the functional layer 36' may cover only a portion of the adhesion layer 34' or it may be superimposed over an entirety of the adhesion layer 34', either substantially coextensive with the adhesion layer 34' or in a manner that extends beyond the adhesion layer 34'.

Figure 5:
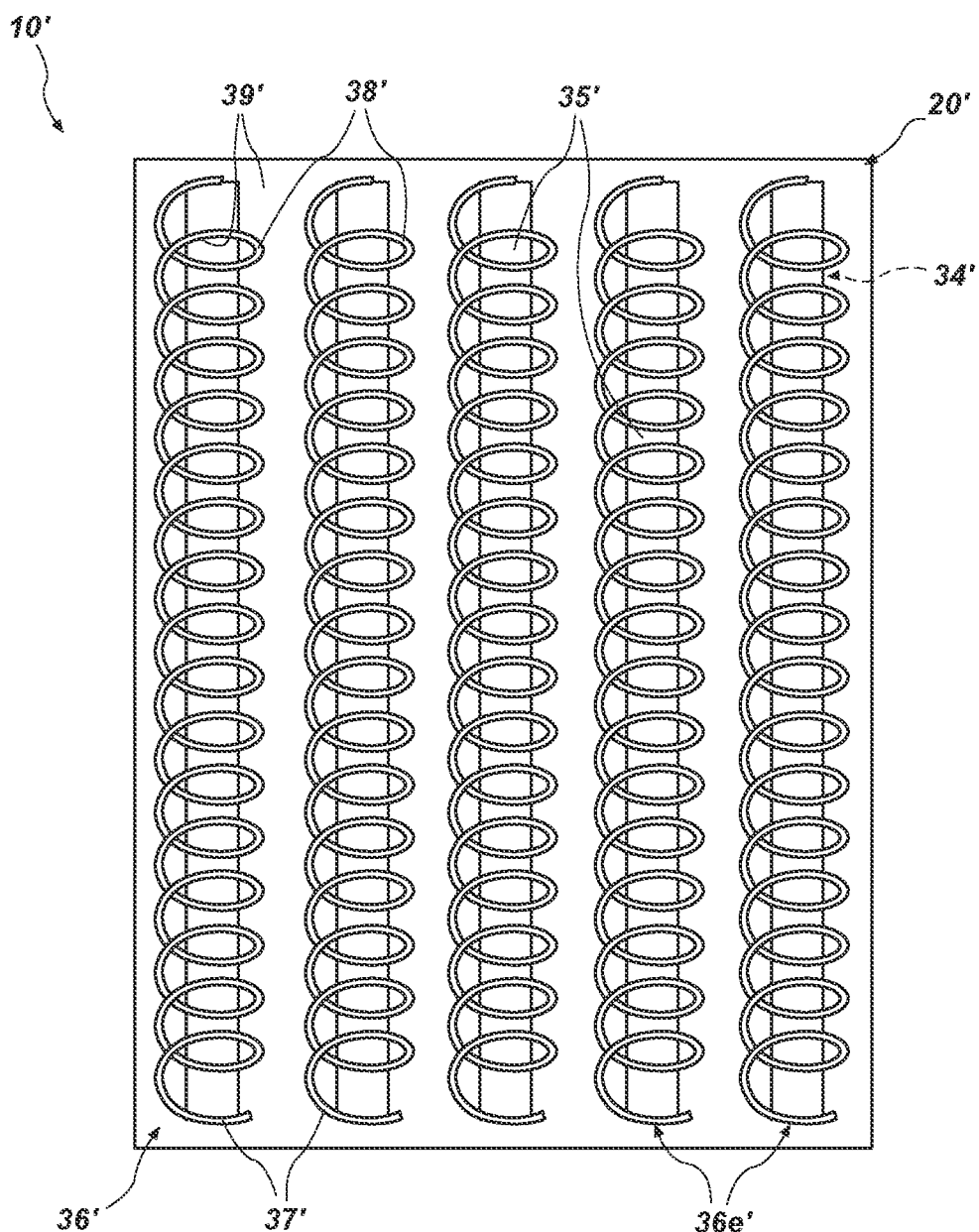
FIG. 5 is a top view showing the substrate and the functional layer of the elastomeric element of the article of manufacture shown in FIG. 3.

Alternatively, as illustrated by FIG. 5, the functional layer 36' may comprise a layer that at least partially covers the substrate 20'. The functional layer 36' may comprise one or more functional elements 36e'. In the embodiment depicted by FIG. 5, the functional layer 36' includes a plurality of functional elements 36e' arranged parallel to one another. Each functional element 36e' of the functional layer 36' may comprise an arrangement of solid structures 37' that define voids 39' throughout the functional layer 36'. The solid structures 37' and voids 39' may be randomly arranged. A single elongated solid structure 37' may define an entire functional element 36e' of the functional layer 36' or the entire functional layer 36'. The functional layer 36' may include a single layer of partially overlapped solid structures 37' or a plurality of layers of solid structures 37'. The solid structures 37' and voids 39' may have configurations that enable air to readily flow through the functional layer 36' in a variety of directions, which may impart the functional layer 36', the elastomeric element 30' and the article of manufacture 10' with breathability. The solid structures 37' of the functional layer 36' may adhere to the adhesion layer 34' and, optionally, to the substrate 20'. The material from which the solid structures 37' are defined may adhere to the adhesion layer 34' in any suitable manner; for example, the material may adhere to a surface of the adhesion layer 34', it may blend, or integrate, with the material of the adhesion layer 34', or the like. The material from which the solid structures 37' are defined may also adhere to the substrate 20' in any of a variety of ways; for example, the material may adhere to a surface of the substrate 20', it may impregnate voids in the substrate 20' (e.g., engagement voids formed in the substrate 20', voids between fibers that define the substrate 20', voids within fibers that define the substrate 20', etc.), or it may adhere to the substrate by a combination of adhesion and impregnation. Alternatively, a separate adhesive (e.g., an adhesive film, an adhesive pattern, etc., applied to the adhesion layer 34' and, optionally, to the substrate 20') may secure the solid structures 37' of the functional layer 36' to the adhesion layer 34' and/or the substrate 20'.

In various embodiments, the solid structures 37' of the functional layer 36' may printed onto the adhesion layer 34' and/or the substrate 20'. In more specific embodiments, the solid structures 37' of the functional layer 36' may comprise continuous elongated elements that overlap themselves and/or each other to define the voids 39' of the functional layer 36'. For example, such a solid structure 37' may follow a winding path (e.g., an elongated, interconnected series of partially superimposed loops 38; a meandering path, a path resembling a wave, etc.) over at least portion of the adhesion layer 34' and/or the substrate 20, over another portion of the same solid structure 37', and/or over another solid structure 37'.

Any of a variety of suitable materials may be used to define the solid structures 37' of the functional layer 36' of the elastomeric element 30'. In some embodiments, the solid structures 37' may be defined from an elastomeric polymer. The elastomeric polymer may adhere well to the substrate 20' and have a sufficient density to impart the functional layer 36' with a desired weight and density. In addition, the elastomeric polymer may compress under a load and then resiliently return to a relaxed state once the load is removed. The elastomeric polymer that defines the solid structures 37' of the functional layer 36' may comprise a different material from that used to define the adhesion layer 34' or the same elastomeric polymer as that used to define the adhesive layer 34'. In embodiments where the substrate 20' is stretchable, a stretchability and a resilience of the elastomeric polymer may match or exceed a stretchability and a resilience of the substrate 20', which may enable the substrate 20' to be stretched to its full extent. Thus, the functional layer 36' may not hinder stretching of the substrate 20' or delaminate from the substrate 20'. For example, the elastomeric polymer that defines the solid structures 37' of the functional layer 36' may comprise an extended triblock copolymer, such as those disclosed by the '137 Patent.

With returned reference to FIG. 3, in embodiments where the article of manufacture 10' includes a cover 40', the cover 40' may comprise any material suitable for the intended use of the article of manufacture 10'. In embodiments where the article of manufacture 10' comprises a weighted blanket, the cover 40' may comprise a fabric. The fabric of the cover 40' may have one or more desired characteristics, such as a particular texture (e.g., softness to the touch, etc.), cooling properties (e.g., moisture wicking, ventilation or breathability, etc.), or the like. The fabric may substantially lack stretchability. Alternatively, the fabric of the cover 40' may be stretchable.

In some embodiments, peripheral edges 42' of the cover 40' may be secured to peripheral edges 22' of the substrate 20'. The peripheral edges 42' of the cover 40' may be secured directly to the peripheral edges 22' of the substrate 20'. Alternatively, the peripheral edges 42' of the cover 40' and the peripheral edges 22' of the substrate 20' may be joined to an intervening element, such as a gusset (e.g., a strip of fabric in embodiments where the substrate 20' and the cover 40' comprise fabrics, etc.), a trim element (e.g., piping, another embellishment, etc.), or the like. By securing the peripheral edges 42' of the cover 40' to the peripheral edges 22' of the substrate 20', the cover 40' and the substrate 20' may define an interior of the article of manufacture 10', within which the elastomeric element 30' of the article of manufacture 10' is contained.

Figure 6:
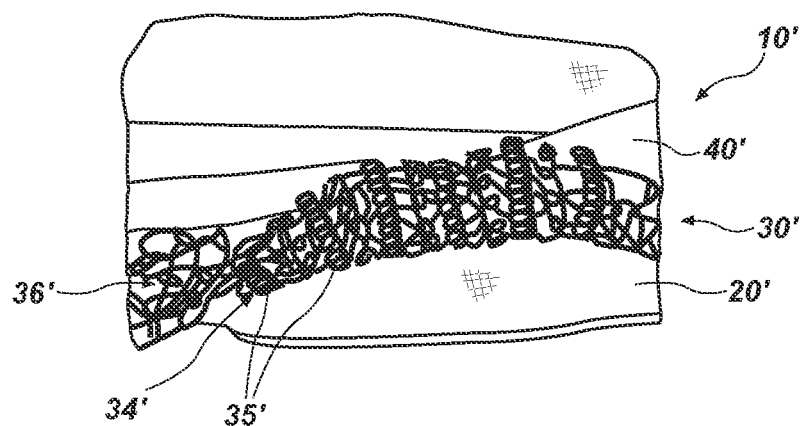
FIG. 6 is an assembly view of the embodiment of the article of manufacture shown in FIG. 3, with the adhesion layer pulled away from the substrate.
Figure 7:
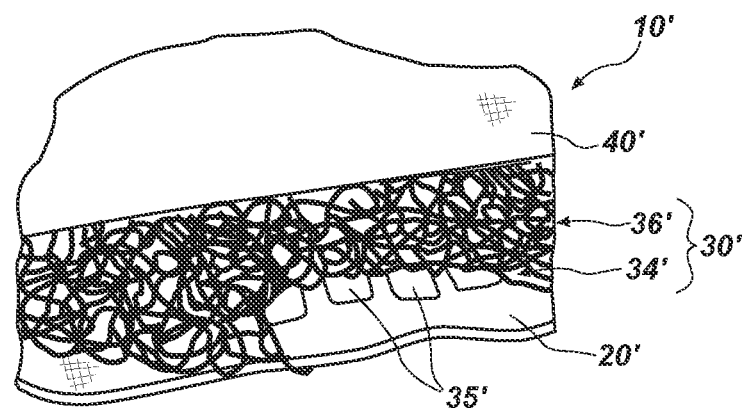
FIG. 7 is another assembly view of the embodiment of the article of manufacture shown in FIG. 3, with the functional layer pulled away from the adhesion layer.
Figure 8:
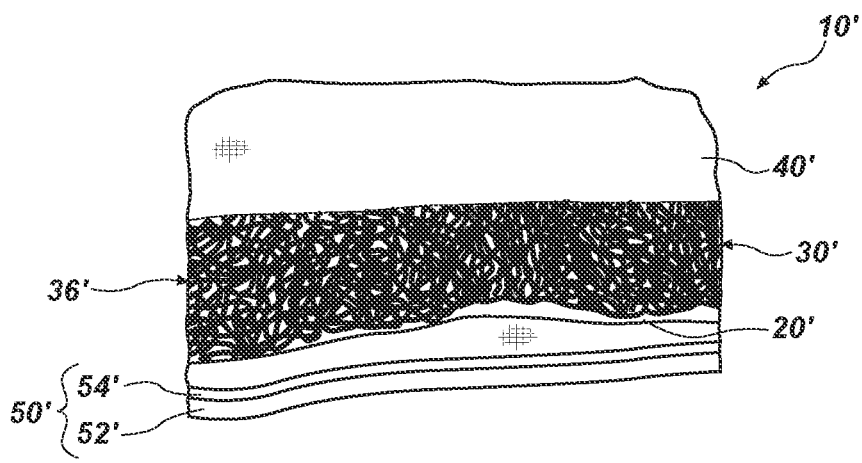
FIG. 8 is an assembly view of the embodiment of the article of manufacture shown in FIG. 3, with the cover pulled away from the functional layer.

FIGS. 6-8 further illustrate the relationship between the substrate 20', the adhesion layer 34', the functional layer 36', and the optional cover 40'. More specifically, FIGS. 6-8 illustrate an article of manufacture 10' that comprises a weighted blanket, with the substrate 20' comprising a first fabric layer, the functional layer 36' of the elastomeric element 30' comprising a weighted layer, and the cover 40' comprising a second fabric layer. FIG. 6 shows the adhesion layer 34' partially pulled away from the substrate 20'. FIG. 7 shows the functional layer 36' partially pulled away from the adhesion layer 34'. FIG. 8 shows the cover 40' partially pulled away from the functional layer 36'.

In addition, the weighted blanket/article of manufacture 10' includes a further layer 50', which may comprise a base layer, adjacent to (e.g., beneath, as shown in FIG. 8) the substrate 20'. The further layer 50' may include a base layer 52' that defines an outer surface of the article of manufacture 10'. In some embodiments, the further layer 50' may also include a filler 54' between the base layer 52' and the substrate 20'. Any suitable type of filler may be employed. Without limitation, the filler 54' may comprise a thermally insulating layer, such as batting, or wadding; a plurality of discrete insulating elements (e.g., foam, feathers, down, etc.); or the like. In embodiments where the substrate 20', the elastomeric element 30', and the cover 40' are breathable, the filler 54' and the base layer 52' may also be breathable. In embodiments where the article of manufacture 10' comprises a weighted blanket, the further layer 50', the substrate 20', the elastomeric element 30', and the cover 40' may be secured (e.g., quilted, etc.) together.

With reference now turned to FIGS. 9, 10A-F, and 11, an embodiment of a manufacturing process and an embodiment of a manufacturing system 70 are shown. The manufacturing system 70 may print an elastomeric polymer 60 onto a substrate 20' to define an adhesion layer 34' (FIGS. 3-4D) of the substrate 20'. The elastomeric polymer 60 may comprise a material that will adhere to the substrate 20' and provide adhesion elements 35' of the adhesion layer 34' with a surface to which a subsequently formed functional layer 36' (FIGS. 3 and 5) may adhere. In some embodiments, the elastomeric polymer 60 may comprise an oil extended SBS or SEBS copolymer of the '137 Patent.

Figure 9:
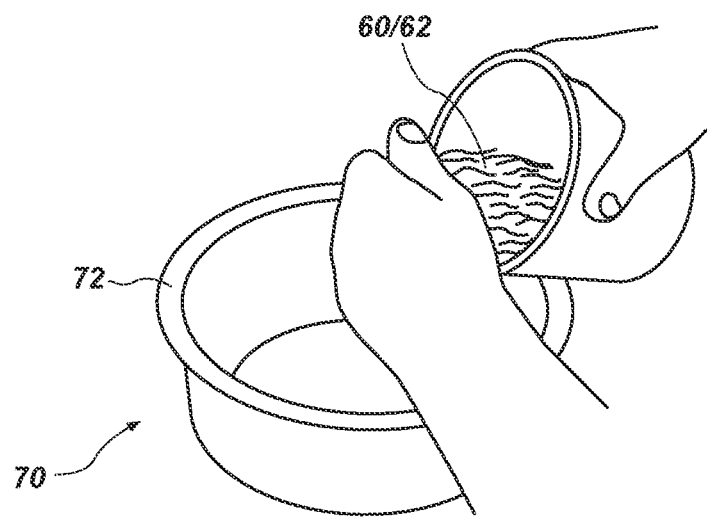
FIGS. 9, 10A-F, and 11 illustrate an embodiment of a manufacturing process that may be used to make an article of manufacture according to this disclosure, as well as features of an embodiment of a manufacturing system.

In FIG. 9, the elastomeric polymer 60 used to define the adhesion layer 34' (FIGS. 3-4D) may be provided in a reservoir 72 of the manufacturing system 70. By way of example, the elastomeric polymer 60 may be introduced into a hopper of an extruder, provided in a reservoir of a computer-controlled printer, or provided in any other suitable manner.

An extruder 74 of the manufacturing system 70 may then heat the elastomeric polymer 60 to a temperature that liquefies the elastomeric polymer 60. In embodiments where the elastomeric polymer 60 comprises an oil extended SBS or SEBS copolymer, as disclosed by the '138 Patent, the elastomeric polymer 60 may be heated to a temperature of about 450° F. (about 230° C.) to about 480° F. (250° C.).

Once the elastomeric polymer 60 has been heated, the extruder 74 may then force the elastomeric polymer 60 into and through an extruder arm 76 and out of nozzles 78 that communicate with the extruder arm 76. The nozzles 78 may be spaced apart along the length of the extruder arm 76. In some embodiments, the nozzles 78 may be spaced equidistantly apart from each other. While FIGS. 10A-10F depict an embodiment of extruder arm 76 that carries six (6) nozzles 78, manufacturing systems 70 with extruder arms 76 that carry fewer or more than six (6) nozzles 78 are also within the scope of this disclosure.

As the liquefied elastomeric polymer 60' is forced out of the nozzles 78, it may be applied to a substrate 20'. For example, as shown in FIGS. 10A-10F, an extruded, liquefied elastomeric polymer 60' may be controllably drizzled onto a substrate 20' carried by a platen (not shown).

Figures 10A, 10B:
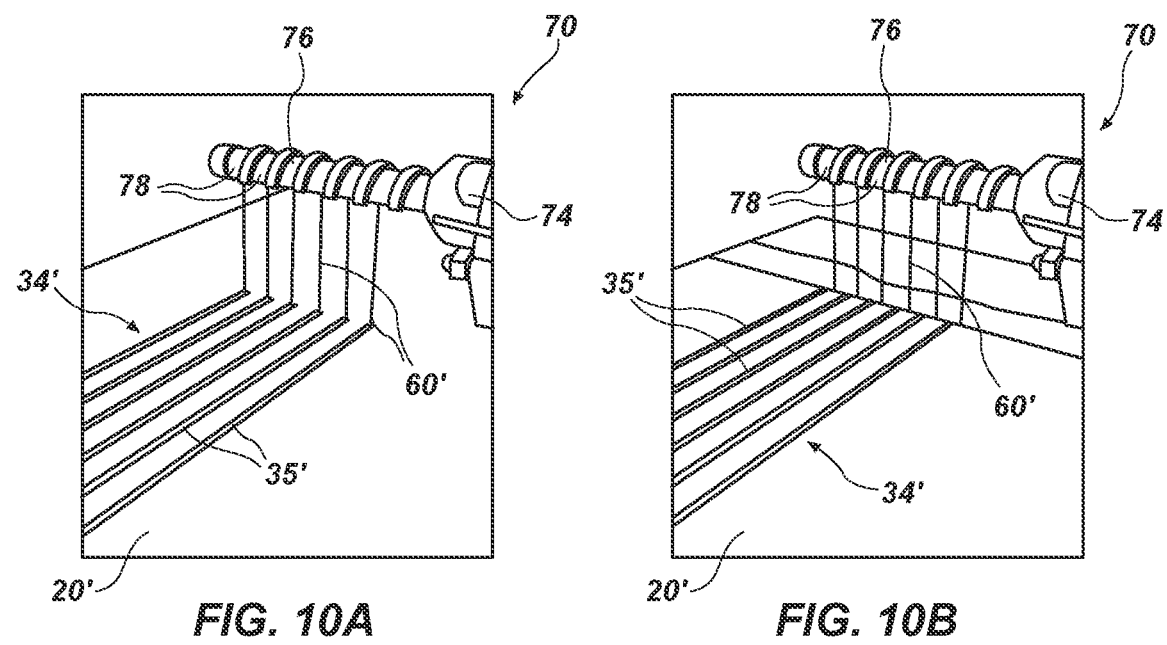

As can be seen from FIGS. 10A-10E, positions of one or both of the extruder 74 or its extruder arm 76 and the platen (not shown) may be moved along at least two axes to provide for controlled application of the liquefied elastomeric polymer 60' to the substrate 20'. As shown in FIGS. 10A and 10B, the platen (not shown) may move a first direction along a first axis (e.g., a y-axis, or length, of the substrate 20', etc.).

Figure 10C:
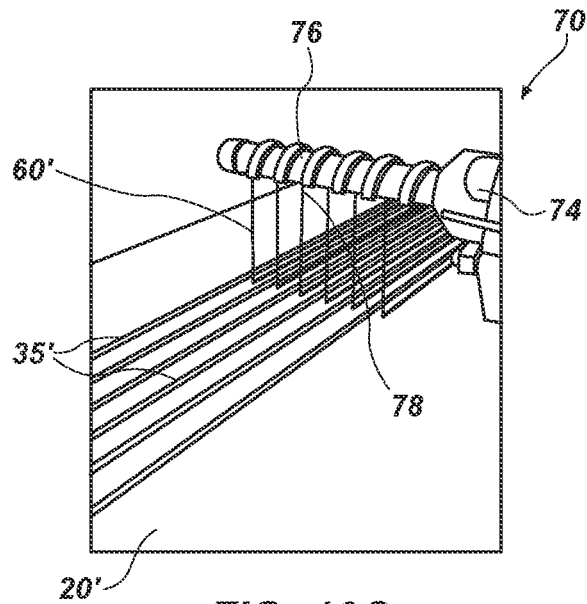

In FIG. 10C, the extruder arm 76 has been moved along a second axis (e.g., an x-axis, or width, of the substrate 20', etc.). The distance the extruder arm 76 moves may be a fraction of the distance between adjacent nozzles 78 on the extruder arm 76 (e.g., half the distance between adjacent nozzles 78, etc.). In addition, in FIG. 10C the direction in which the platen (not shown) travels has been reversed to a second direction, which is opposite from the first direction.

Figure 10D:
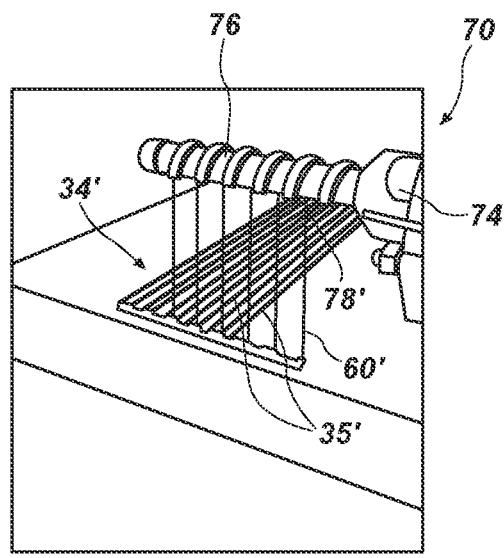
Figure 10E:
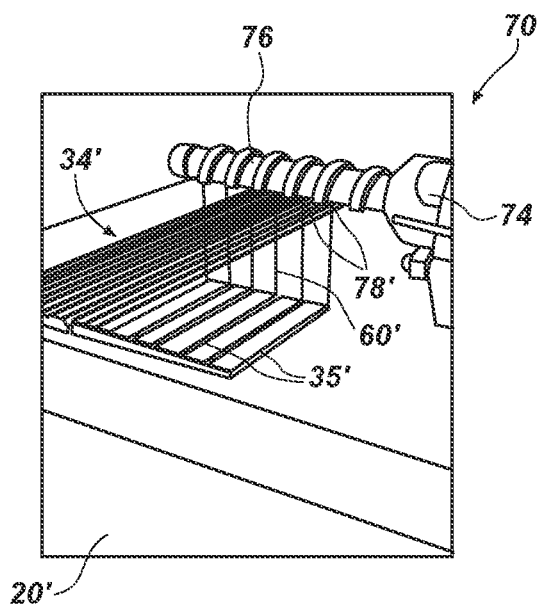

In FIG. 10D, the extruder arm 76 has been moved further along the second axis. The distance the extruder arm 76 has moved between FIGS. 10C and 10D exceeds the distance between the outermost nozzles 78 on the extruder arm 76 by the distance between adjacent nozzles 78 on the extruder arm 76. For example, if the extruder arm 76 carries six (6) nozzles 78 and the distance between adjacent nozzles 78 is equal to n, the distance between the outermost nozzles 78 is 5n and the distance the extruder arm 76 is moved is equal to 5n–n, or 6n. Movement of the platen 80 may cease momentarily while the extruder arm 76 moves. Movement of the extruder arm 76 along the second axis may coincide with a change in direction along the first axis in which the platen 80 moves. As shown in FIG. 10E, once the extruder arm 76 has been moved to the new position shown in FIG. 10D, the direction of travel of the platen 80 may again change, with the platen 80 again travelling in the first direction, i.e., the direction of travel seen in FIGS. 10A and 10B.

Figure 10F:
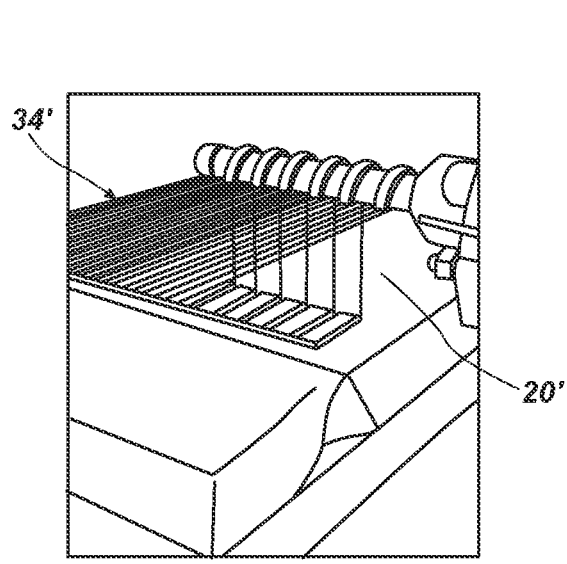

FIG. 10F shows a nearly completed adhesion layer 34' on the substrate 20'.

Although FIGS. 9-10F show an embodiment of manufacturing system 70 that applies an elastomeric polymer 60 to a substrate 20' by drizzling or dripping the elastomeric polymer 60 onto the substrate 20', manufacturing systems that provide even further control over the application of the elastomeric polymer 60 (e.g., a manufacturing system that includes a computer-controlled printer, etc.) may be used, as may other embodiments of manufacturing systems.

Figure 11:
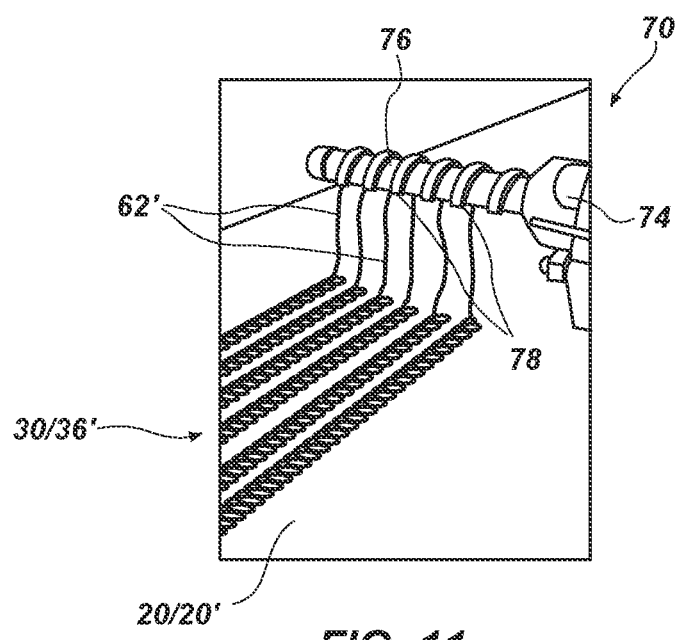

FIG. 11 illustrates use of the manufacturing system 70 to define an embodiment of an elastomeric element 30 on a substrate 20 (FIGS. 1 and 2) or a functional layer 36' of an elastomeric element 30' on an adhesion layer 34' of the elastomeric element 30' and, optionally, onto a substrate 20' to which the adhesion layer 34' is secured (FIGS. 3 5). The elastomeric element 30/functional layer 36' may be defined from an elastomeric polymer 62 that will adhere to the substrate 20' and/or the adhesion layer 34' (see, e.g., FIG. 3; FIG. 10F). In addition, the elastomeric polymer 62 from which the elastomeric element 30/functional layer 36' is formed may provide an elastomeric element 30, 30' (FIG. 3) with one or more desired properties (e.g., compressibility, resilience, density, weight, etc.). In some embodiments, the elastomeric polymer 62 may comprise an oil extended SBS or SEBS copolymer, such as those disclosed by the '137 Patent.

The elastomeric polymer 62 may be provided to the manufacturing system 70 in any suitable way, such as that described in reference to FIG. 9, and the manufacturing system 70 may be operated substantially as described in reference to FIGS. 10A 10F to define the elastomeric element 30/functional layer 36'. In embodiments where an entire elastomeric element 30 is formed from the elastomeric polymer 62, the extruder 74 of the manufacturing system 70 may heat the elastomeric polymer 62 to a temperature of about 450° F. (about 230° C.) to about 480° F. (250° C.) to enable the liquefied elastomeric polymer 62' to adhere to the substrate 20. In embodiments where the elastomeric polymer 62 forms a functional layer 36' of an elastomeric element 30', the extruder 74 of the manufacturing system 70 may heat the elastomeric polymer 62 to a temperature of about 380° F. (about 195° C.), which may enable the elastomeric polymer 62 to adhere to the adhesion layer 34' (FIGS. 3 and 10F) without completely melting the adhesion layer 34' and to adhere to the substrate 20'.

The extruder 74 of the manufacturing system 70 may apply appropriate force to the liquefied elastomeric polymer 62' to cause the liquefied elastomeric polymer 62' to exit nozzles 78 of the extruder arm 76 in a so-called "noodled" configuration, in which each elongated weighted element is configured as an elongated series of partially overlapping loops. Similar effects may be achieved by moving the extruder arm 76 (e.g., back and forth along the second axis, over a small circular path, etc.) as the liquefied elastomeric polymer 62' exits the nozzles 78.

Turning now to FIG. 12, an embodiment of an article of manufacture 10" that comprises a weighed blanket is depicted. The weighted blanket includes a substrate 20", an adhesion layer 34" carried by the substrate 20", a weighted layer 36" over the adhesion layer 34", and a cover 40" over the adhesion layer 40". A further layer 50" is located beneath the substrate 20". The substrate 20", the cover 40", and a base 52" of the further layer 50" may comprise breathable fabrics. The adhesion layer 34" and the weighted layer 36" may define a breathable elastomeric element 30". A filler 54" of the further layer 50" may also be breathable. The breathability of the various elements of the weighted blanket, along with the weight provided by its weighted layer 36", may provide for a weighted blanket that provides comfort from both its weight and its breathability.

Figure 13:
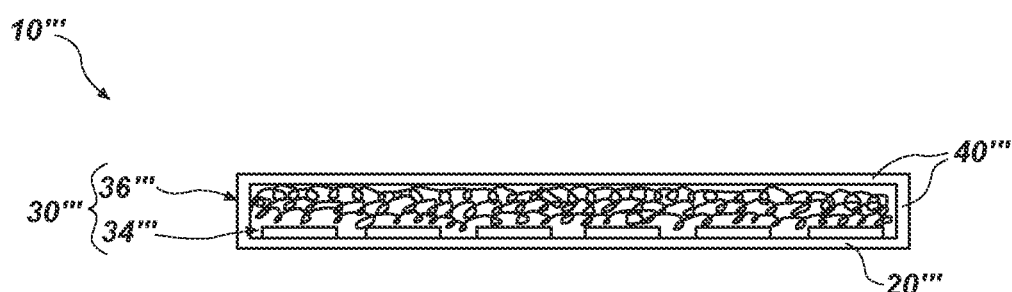
FIG. 13 is a cross-sectional representation of an embodiment of an article of manufacture comprising a cushioning element.

FIG. 13 depicts another embodiment in which an article of manufacture 10''' comprises a cushioning element, such as a seat cushion, a mattress topper, an anti-fatigue mat, or the like. The cushioning element includes a substrate 20''' that defines a suitable base for the cushioning element. For example, the substrate 20''' may comprise a fabric layer in embodiments where the cushioning element comprises a seat cushion or a mattress topper. As another example, the substrate 20''' may comprise a rubber base with a configuration that grips a floor in embodiments where the cushioning element comprises an anti-fatigue mat. The elastomeric element 30''' of the cushioning element may include one or more layers, such as an adhesion layer 34", a cushioning layer 36", etc. A compressibility of the elastomeric element 30''' may depend on its use. For example, a seat cushion may be relatively soft, while the softness/firmness of a mattress topper may be tailored to provide a sleeping surface with a desired softness or firmness. A cover 40''' of the cushioning element may correspond to the intended use of the cushioning element. For example, in embodiments where the cushioning element comprises a seat cushion or a mattress topper, the cover 40''' may comprise a fabric with a stretchability that enables the elastomeric element 30''' to compress and resiliently expand to the same extent or substantially the same extent as it would if the cover 40''' were not present. As another example, in embodiments where the cushioning element comprises an anti-fatigue mat, the cover 40''' may provide a durable, anti-slip on which an individual can securely and reliably stand.

Although the preceding disclosure provides many specifics, these should not be construed as limiting the scope of any of the claims that follow, but merely as providing illustrations of some embodiments of elements and features of the disclosed subject matter. Other embodiments of the disclosed subject matter, and of their elements and features, may be devised which do not depart from the spirit or scope of any of the claims. Features from different embodiments may be employed in combination. Accordingly, the scope of each claim is limited only by its plain language and the legal equivalents thereto.

What is claimed:

1. A weighted blanket comprising:
    a fabric layer;
    an adhesion layer on the fabric layer, extending substantially across the fabric layer, comprising an elastomeric gel, comprising elongated elements having winding configurations, and only partially covering the fabric layer; and
    a weighted layer comprising an elastomeric gel on the adhesion layer, extending substantially across the fabric layer, comprising elongated elements having winding configurations, and only partially covering the fabric layer.

2. The weighted blanket of claim 1, wherein the adhesion layer and the weighted layer comprise the same material.

3. The weighted blanket of claim 1, wherein the adhesion layer covers at most half of an area of the fabric layer.

4. The weighted blanket of claim 1, wherein the adhesion layer covers at most one fourth of an area of the fabric layer.

5. The weighted blanket of claim 1, further comprising: a cover on an opposite side of the weighted layer from the fabric layer.

6. A weighted blanket comprising:
    a fabric layer;
    an adhesion layer on the fabric layer, the adhesion layer comprising a plurality of adhesion features oriented generally parallel to one another, each adhesion feature of the plurality of adhesion features comprising an elongated adhesion feature having a winding configuration; and
    a weighted layer on the adhesion layer, the weighted layer comprising a plurality of weighted features oriented generally parallel to one another, each weighted feature of the plurality of weighted features comprising an elongated weighted feature having a winding configuration.

7. The weighted blanket of claim 6, wherein each of the adhesion layer and the weighted layer comprises an elastomeric gel.

8. The weighted blanket of claim 7, wherein the adhesion layer and the weighted layer comprise the same elastomeric gel.

9. The weighted blanket of claim 6, wherein the elongated weighted feature of each weighted feature is partially superimposed over the elongated adhesion feature of a corresponding adhesion feature.

10. A method for manufacturing a weighted blanket, comprising:
    applying an adhesion material heated to a first temperature to a fabric layer to define an adhesion layer comprising a plurality of elongated adhesion features on a surface of the fabric layer, the adhesion layer adhering to the fabric layer; and
    applying a weighted material heated to a second temperature less than the first temperature to the adhesion layer to define a weighted layer comprising a plurality of elongated weighted features to the adhesion layer, the weighted layer adhering to the adhesion layer.

11. The method of claim 10, wherein applying the adhesion layer comprises applying the plurality of elongated adhesion features generally parallel to one another.

12. The method of claim 11, wherein applying the weighted layer comprises defining each of the plurality of elongated weighted features as an elongated element having a winding configuration.

13. The method of claim 10, wherein the weighted layer extends substantially across the fabric layer.

14. The method of claim 10, wherein applying the adhesion material and applying the weighted material comprise applying the same material heated to different temperatures.

15. A weighted blanket comprising:
    a fabric layer;
    an adhesion layer on the fabric layer; and
    a weighted layer on the adhesion layer and comprising elongated elements having winding configurations.

16. The weighted blanket of claim 15, wherein:
    the adhesion layer includes a plurality of elements spaced apart from each other over the fabric layer; and
    the weighted layer extends substantially over the fabric layer.

17. The weighted blanket of claim 16, further comprising: a cover on an opposite side of the weighted layer and the adhesion layer from the fabric layer.

* * * * *